(12) United States Patent
Lo et al.

(10) Patent No.: US 8,368,795 B2
(45) Date of Patent: Feb. 5, 2013

(54) NOTEBOOK COMPUTER WITH MIRROR AND IMAGE PICKUP DEVICE TO CAPTURE MULTIPLE IMAGES SIMULTANEOUSLY

(75) Inventors: Jui-Hsiang Lo, Taipei (TW); Ying-Jieh Huang, Taipei (TW); Ming-Ta Hsu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 607 days.

(21) Appl. No.: 12/614,160

(22) Filed: Nov. 6, 2009

(65) Prior Publication Data

US 2011/0069181 A1 Mar. 24, 2011

(30) Foreign Application Priority Data

Sep. 18, 2009 (TW) .............................. 98131511 A

(51) Int. Cl.
*H04N 5/222* (2006.01)
*H04N 5/225* (2006.01)
(52) U.S. Cl. .................... 348/333.02; 348/340; 348/373
(58) Field of Classification Search .................. 348/373, 348/376
See application file for complete search history.

(56) References Cited

U.S. PATENT DOCUMENTS

| | | | | |
|---|---|---|---|---|
| 5,765,063 A * | 6/1998 | Fukuda et al. | ................. | 396/332 |
| 6,064,752 A * | 5/2000 | Rozmus et al. | ............... | 382/117 |
| 6,721,500 B2 * | 4/2004 | Perisic | ........... | 396/331 |
| 6,731,778 B1 * | 5/2004 | Oda et al. | ...................... | 382/118 |
| 6,812,463 B2 * | 11/2004 | Okada | ........................... | 250/332 |
| 7,050,106 B2 * | 5/2006 | Nagano | ........................ | 348/373 |
| 7,173,605 B2 * | 2/2007 | Fong et al. | .................... | 345/168 |
| 7,869,204 B2 * | 1/2011 | Bair et al. | ................. | 361/679.3 |
| 7,907,117 B2 * | 3/2011 | Wilson et al. | ................. | 345/156 |
| 7,911,532 B2 * | 3/2011 | Pai et al. | ...................... | 348/376 |
| 2005/0104850 A1 * | 5/2005 | Hu et al. | ..................... | 345/157 |
| 2006/0158435 A1 * | 7/2006 | Lin et al. | ...................... | 345/168 |
| 2006/0177109 A1 * | 8/2006 | Storch | .......................... | 382/118 |
| 2009/0102939 A1 * | 4/2009 | Ahuja et al. | ............... | 348/222.1 |
| 2010/0328420 A1 * | 12/2010 | Roman | ...................... | 348/14.08 |
| 2011/0043702 A1 * | 2/2011 | Hawkins | ...................... | 348/584 |
| 2011/0102570 A1 * | 5/2011 | Wilf et al. | ........................ | 348/77 |
| 2012/0026298 A1 * | 2/2012 | Filo et al. | ......................... | 348/49 |

* cited by examiner

*Primary Examiner* — Ngoc-Yen Vu
(74) *Attorney, Agent, or Firm* — Kirton McConkie; Evan R. Witt

(57) ABSTRACT

A notebook computer with a multi-image capturing function is provided. The notebook computer includes an image pickup device and a mirror. The image pickup device is used for capturing a first image. The mirror is disposed beside the image pickup device and tilted by an angle with respect to the image pickup device. A second image reflected by the mirror is adjustable by changing the angle. The second image reflected by the mirror is also captured by the image pickup device, so that the first image and the second image are simultaneously captured by the image pickup device.

9 Claims, 5 Drawing Sheets

NOTEBOOK COMPUTER WITH MIRROR AND IMAGE PICKUP DEVICE TO CAPTURE MULTIPLE IMAGES SIMULTANEOUSLY

FIELD OF THE INVENTION

The present invention relates to a notebook computer, and more particularly to a notebook computer with a multi-image capturing function.

BACKGROUND OF THE INVENTION

With increasing development of high technology industries, computers and their peripheral devices become essential electronic apparatuses in our daily lives. Image pickup devices are widely used in notebook computers to take photographs or record video data in order to provide convenience to the human beings. For example, through the video conference, the users at different cities or countries could discuss with each other. When a network communication program is executed to perform a videoconferencing function, the image of a first user could be captured by a web camera of a computer system at a first terminal. By the network communication program, the image of the first user at the first terminal is transmitted to the computer system of a second user at a second terminal through internet connection. As such, the image of the first user could be outputted from the computer monitor or an image output device at the second terminal. Similarly, by the same manner, the image of the second user could be obtained by the web camera of the computer system at the second terminal and then transmitted to the first user at the first terminal. Under this circumstance, the videoconferencing technique will enable individual users in faraway sites to have meetings or communicate with each other.

FIG. 1 is a schematic view illustrating the use of a notebook computer having an image pickup device according to the prior art. As shown in FIG. 1, the notebook computer 1 comprises a screen 10, an input device 11 (e.g. a keyboard or a touchpad) and an image pickup device 12. The image pickup device 12 is arranged on an upper edge of the screen 10 for capturing the environmental image at the user terminal. By using the notebook computer 1 and through internet connection, the user 2 could communicate with other users at different sites in order to have a video conference. Generally, the image pickup device 12 has a fixed shooting angle. Due to the fixed shooting angle, the shooting area of the image pickup device 12 is restricted by the narrow shooting angle. As shown in FIG. 1, only the environmental scene within the shooting area A1 could be effectively captured by the image pickup device 12.

For capturing the image of another environmental scene that exceeds the shooting area A1, the notebook computer 1 is usually equipped with an additional image pickup device. For example, the additional image pickup device is used to capturing the image of the environmental scene within the shooting area A2. The additional image pickup device increases the fabricating cost of the notebook computer 1 and occupies space of the notebook computer 1. For solving these drawbacks, a fisheye lens is used to replace the lens that originally used in the image pickup device 12 in order to increase the shooting area of the image pickup device 12. Since the image obtained by the fisheye lens is usually distorted, the application thereof is still unsatisfactory.

SUMMARY OF THE INVENTION

The present invention relates to a notebook computer with an image capturing function, and more particularly to a notebook computer for simultaneously capturing multiple images.

In accordance with an aspect of the present invention, there is provided a notebook computer with a multi-image capturing function. The notebook computer includes an image pickup device and a mirror. The image pickup device is used for capturing a first image. The mirror is disposed beside the image pickup device and tilted by an angle with respect to the image pickup device. A second image reflected by the mirror is adjustable by changing the angle. The second image reflected by the mirror is also captured by the image pickup device, so that the first image and the second image are simultaneously captured by the image pickup device.

In an embodiment, the notebook computer further includes an input block and a screen. The input block is served as a directive interface. An image of the input block is reflected by the mirror, so that the image of the input block is captured by the image pickup device. A movable cursor is shown on the screen. According to a change of the image of the input block, a moving direction and a trajectory of the cursor are obtained.

In an embodiment, a user's finger is moved on the input block in a specified moving direction and a specified trajectory, thereby causing the change of the image of the input block.

In an embodiment, the notebook computer further includes an input block and a screen. The input block is served as a text input interface. The input block includes a plurality of key regions with different symbols. An image of the input block is reflected by the mirror, so that the image of the input block is captured by the image pickup device. The screen is used for outputting a text that is inputted into the notebook computer. The text that is inputted into the notebook computer is obtained according to a change of the image of the input block.

In an embodiment, the key regions with different symbols on the input block are sheltered or depressed, thereby causing the change of the image of the input block.

In an embodiment, an image of an object is included in the first image and the second image at different viewing angles. A spatial position of the object is acquired by using a stereo image analysis program.

In an embodiment, the object is a human face. The notebook computer has a facial recognition function by computing a spatial position of an organ on the human face.

In an embodiment, the image pickup device has a function of detecting an environmental brightness value.

In an embodiment, the notebook computer further includes a keyboard for inputting a text to the notebook computer. The keyboard has an illuminating function that is enabled according to the environmental brightness value. An image of the keyboard is reflected by the mirror, so that the image of the keyboard is captured by the image pickup device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
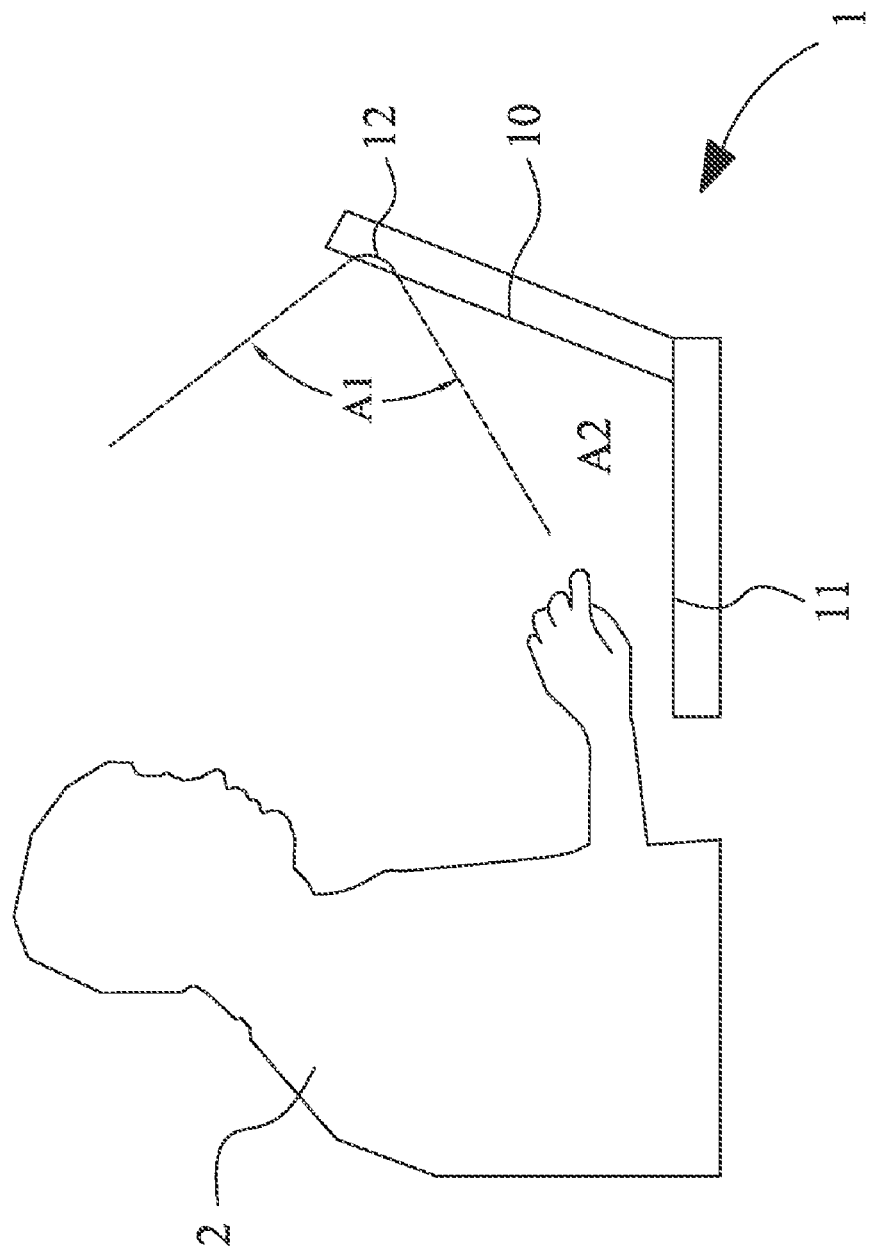
FIG. 1 is a schematic view illustrating the use of a notebook computer having an image pickup device according to the prior art.
Figure 2:
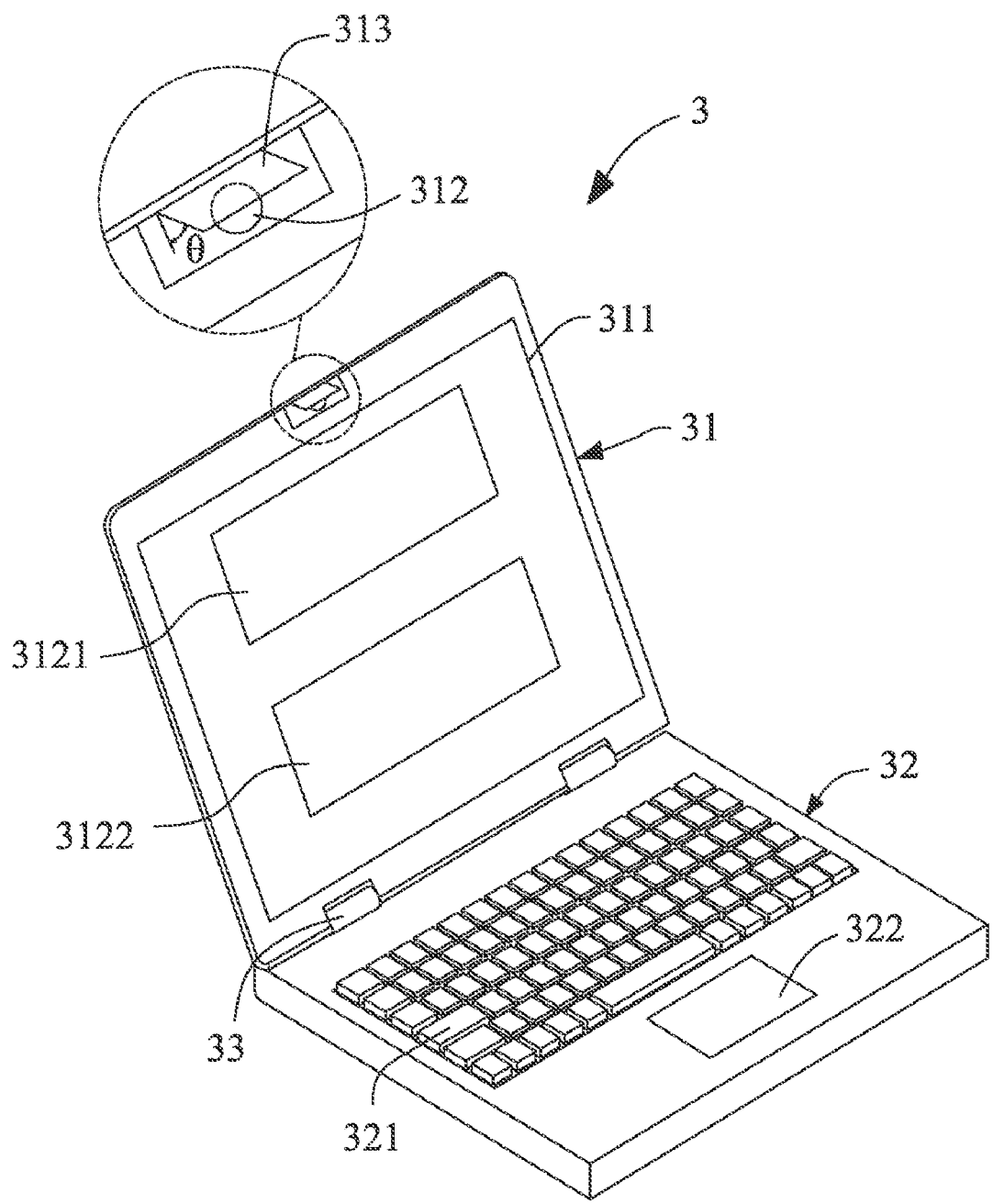
FIG. 2 is a schematic perspective view illustrating a notebook computer with a multi-image capturing function according to a first embodiment of the present invention.

FIG. 2 is a schematic perspective view illustrating a notebook computer with a multi-image capturing function according to a first embodiment of the present invention. As shown in FIG. 2, the notebook computer 3 comprises an upper cover 31 and a base 32. The upper cover 31 is pivotally couple to the base 32 via a hinge 33. The upper cover 32 comprises a screen 311 and an image pickup device 312. The image pickup device 312 is disposed on an upper edge of the screen 311 for capturing an image of an environmental scene at the user terminal. The image of an environmental scene at the user terminal is also referred herein as a first image 3121. In addition, the notebook computer 3 has a keyboard 321 and a touchpad 322, those are mounted on the base 32. Via the keyboard 321, the user could input characters or signs to the notebook computer 3. The touchpad 322 is served as a directive interface for the user. In accordance with a key feature of the present invention, a mirror 313 is disposed above the image pickup device 312. An image of the environmental scene reflected by the mirror 313 could also be captured by the image pickup device 312, thereby obtaining a second image 3122. In other words, the first image 3121 and the second image 3122 could be simultaneously captured by the image pickup device 312. The first image 3121 and the second image 3122 are outputted to the screen 311 of the notebook computer 3. An included angle θ is defined between the mirror 313 and the image pickup device 312. By changing the included angle θ, the second image 3122 is adjustable.

Figure 3:
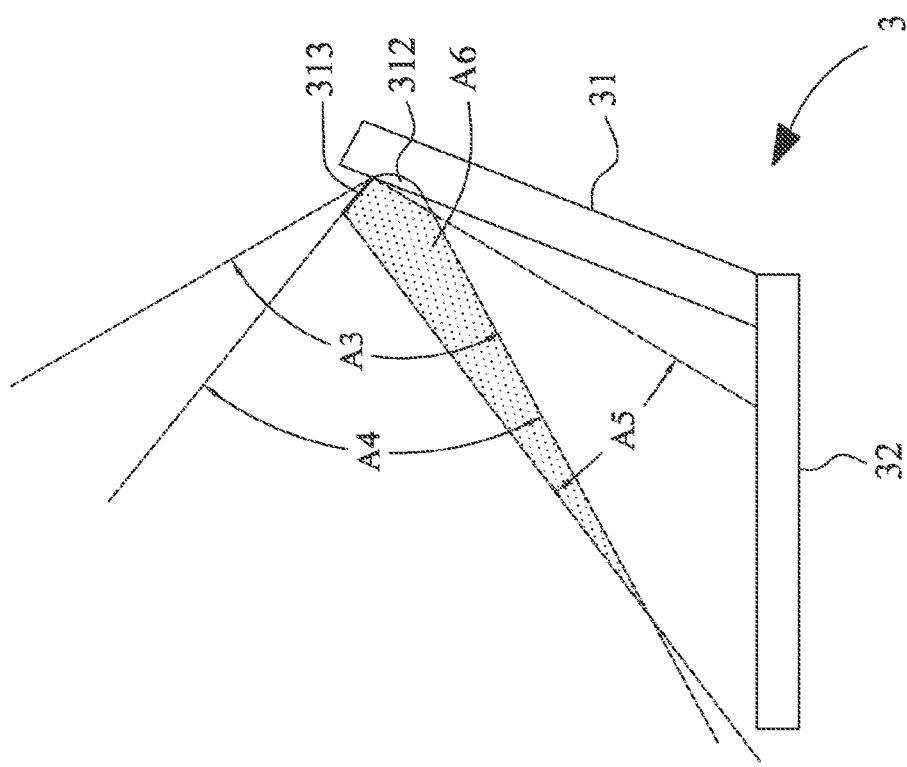
FIG. 3 is a schematic side view illustrating the notebook computer of FIG. 2.

Hereinafter, the operation principles of the present invention will be illustrated with reference to FIG. 3. FIG. 3 is a schematic side view illustrating the notebook computer of FIG. 2. In a case that the mirror 313 is not included, the image pickup device 312 has an original shooting area A3. After the mirror 313 is disposed above the image pickup device 312, the image pickup device 312 has a reduced shooting region A4. Even if the shooting region is reduced because of the arrangement of the mirror 313, no adverse influence occurs. Moreover, since the image of the environmental scene reflected by the mirror 313 has a scene area A5, the object within the shooting region A4 and the scene area A5 could be captured by the image pickup device 312.

As shown in FIG. 3, the shooting region A4 and the scene area A5 have an overlapped area A6 (the darkened part). The image of an object, which is located within the overlapped area A6, will be included in the first image 3121 and the second image 3122 at different viewing angles. Generally, the image of the object having at least two viewing angles could be analyzed by an image analysis program of the notebook computer 3. According to the computation on the image aberration data by using the image analysis program, the spatial position of the object is acquired. As a consequence, the notebook computer 3 has a function of inputting a stereo image. The applications of the stereo image input function are very broad. For example, if the user's face enters the overlapped area A6, the images of the face that are obtained at different viewing angles will be analyzed in order to realize the dimension of a specified organ on the face (e.g. the height of the nose, the thickness of the lip, or the like). In other words, the notebook computer 3 has the benefit of facial recognition. The method of computing the image aberration data by the image analysis program is known to the person skilled in the art, and is not redundantly described herein.

Hereinafter, some application examples of the notebook computer with a multi-image capturing function will be illustrated in more details. Please refer to FIG. 2 again. In this embodiment, the keyboard 321 of the notebook computer 3 is an illuminated keyboard that could emit light in a dark environment. In addition, since the image of the keyboard 321 is reflected by the mirror 313, the image of the keyboard 321 could be captured by the image pickup device 312. Moreover, the image pickup device 312 has a function of detecting the brightness value of the environment. In a case that the notebook computer 3 is used in a dim environment, the image pickup device 312 will discriminate that the brightness value of the keyboard 321 is too low. As such, the illuminating function of the keyboard 321 is enabled. Under this circumstance, the user could easily input texts via the keyboard 321 and thus the possibility of being suffered from vision impairment is minimized.

Figure 4:
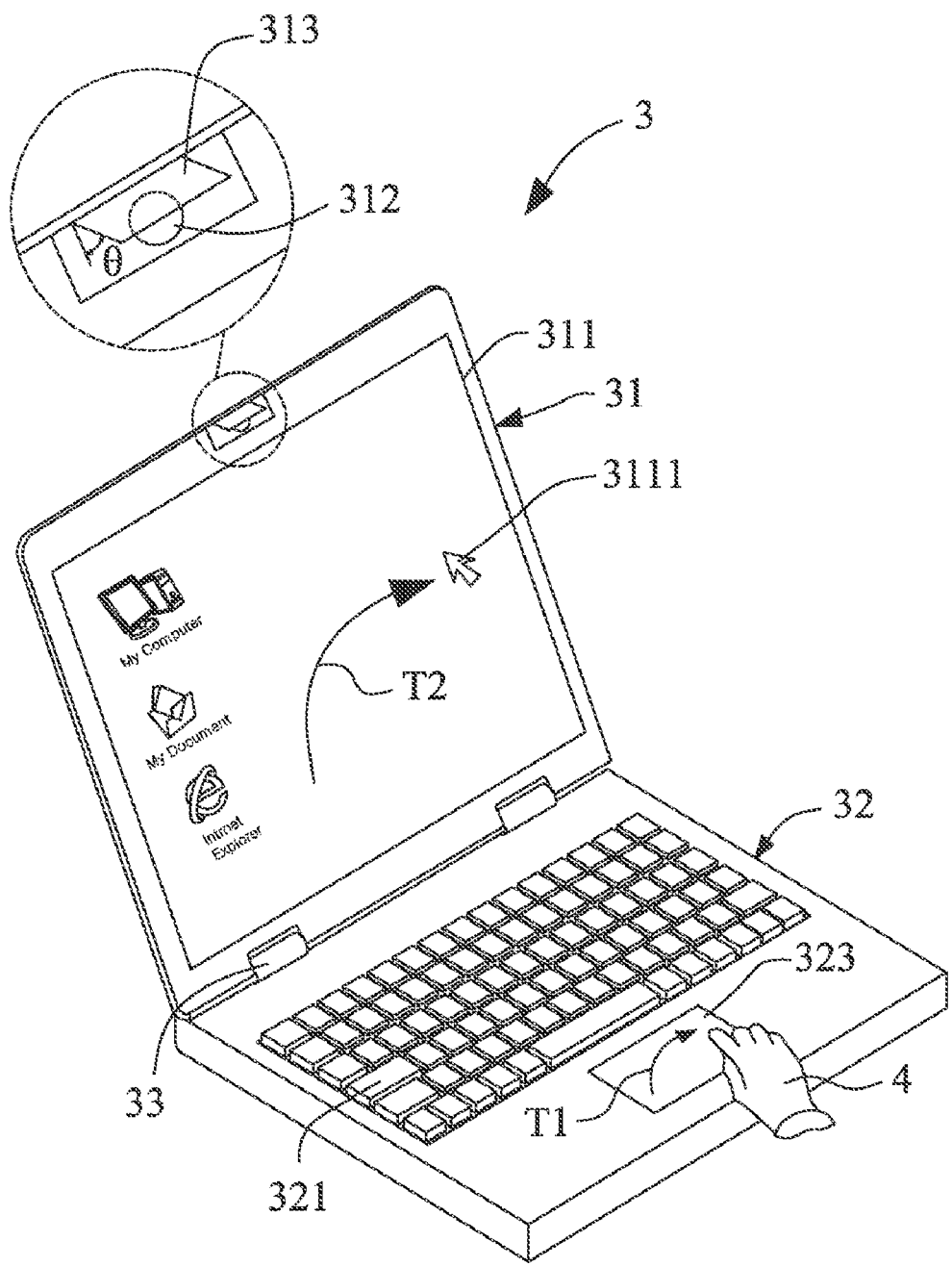
FIG. 4 is a schematic perspective view illustrating a notebook computer with a multi-image capturing function according to a second embodiment of the present invention.

FIG. 4 is a schematic perspective view illustrating a notebook computer with a multi-image capturing function according to a second embodiment of the present invention. In comparison with the first embodiment, the notebook computer 3 of FIG. 4 has an input block 323 in replace of the touchpad 322 (see FIG. 2). The input block 323 is distinguished from the touchpad that is used in the general notebook computer. Since no touchpad is included in the notebook computer 3, the touchpad circuit that is usually disposed under the touchpad will be omitted. In this embodiment, the input block 323 is served as a directive interface. The image of the input block 323 is reflected by the mirror 313, so that the image of the input block 323 could be captured by the image pickup device 312. According to a change of the image of the input block 323, a moving direction and a trajectory of a cursor 3111 shown on the screen 311 are obtained. As shown in FIG. 4, when a user's finger 4 is moved on the input block 323 in a specified trajectory T1, the change of the image of the input block 323 is obtained. According to computation, the cursor 3111 shown on the screen 311 is moved in the trajectory T2.

Figure 5:
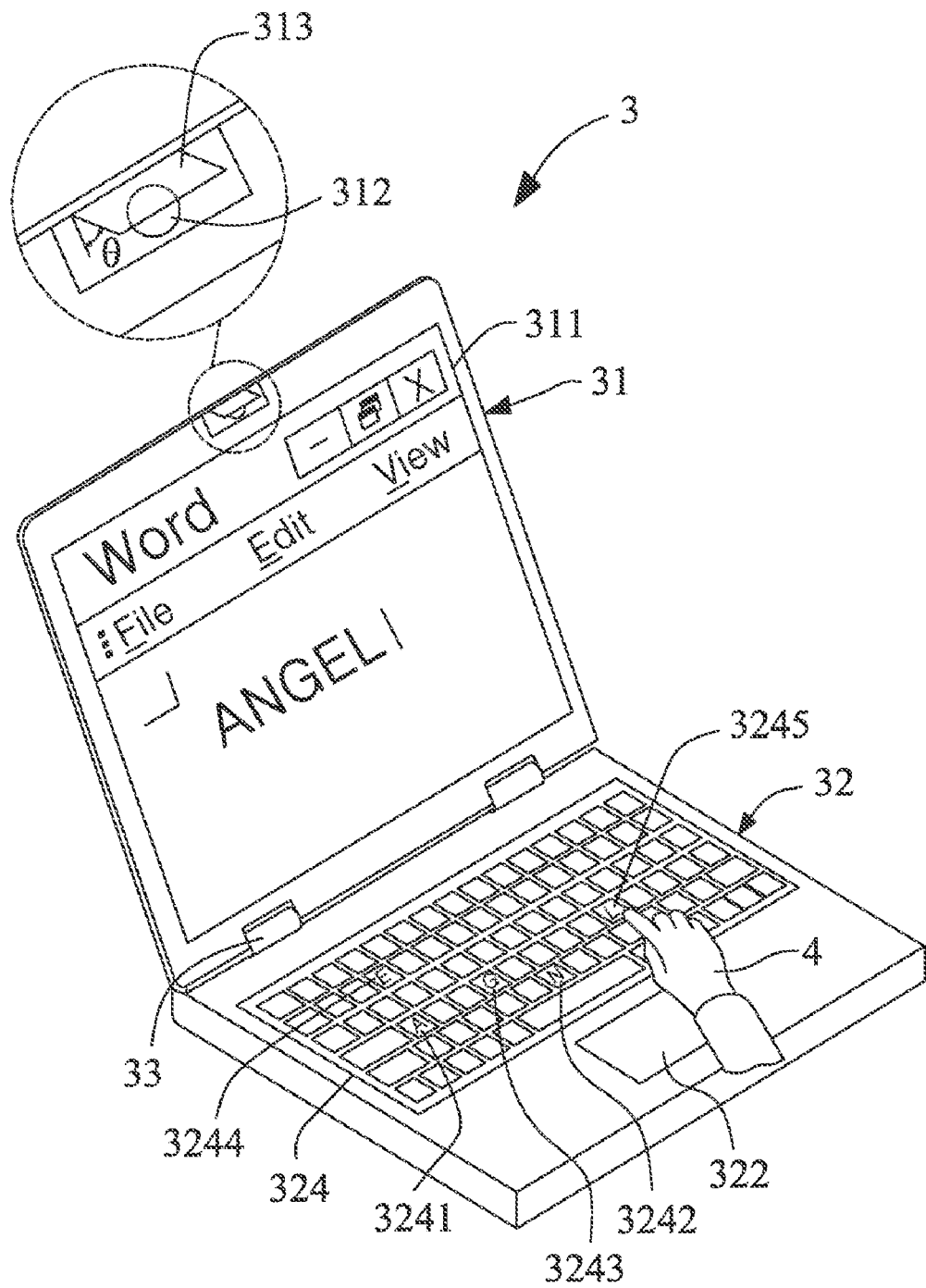
FIG. 5 is a schematic perspective view illustrating a notebook computer with a multi-image capturing function according to a third embodiment of the present invention.

FIG. 5 is a schematic perspective view illustrating a notebook computer with a multi-image capturing function according to a third embodiment of the present invention. In comparison with the first embodiment, the notebook computer 3 of FIG. 5 has an input block 324 in replace of the keyboard 321 (see FIG. 2). The input block 324 comprises a plurality of key regions with different symbols. The input block 324 is distinguished from the keyboard that is used in the general notebook computer. As such, the keyboard circuit under that is usually under the keyboard will be omitted. In this embodiment, the input block 324 is served as a text input interface. The image of the input block 324 is reflected by the mirror 313, so that the image of the input block 324 could be captured by the image pickup device 312. According to a change of the image of the input block 324, a text could be inputted into the notebook computer 3. As shown in FIG. 5, when a user's finger 4 are placed on the input block 324 to successively shelter or depress the A-key region 3241, the N-key region 3242, the G-key region 3243, the E-key region 3244 and the L-key region 3245, the change of the image of the input block 324 is obtained by the image pickup device 312. According to computation, a text "ANGEL" will be shown on the screen 311.

From the above description, the notebook computer of the present invention utilizes an image pickup device and a mirror to simultaneously capture the image of an environmental scene and the image of another environmental scene reflected by the mirror, thereby achieving a multi-image input function. Since the notebook computer is not equipped with an additional specific image pickup device, the space utilization of the notebook computer is enhanced and the notebook computer is relatively cost-effective. Moreover, the multi-image input function used in the notebook computer of the present invention could be expanded to the applications of inputting a stereo image, detecting the environmental brightness value, serving as a directive interface, or serving as a text input interface, for example.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A notebook computer with multi-image capturing function for producing a spatial image, said notebook computer comprising:
    an image pickup device for capturing a first image;
    a mirror disposed beside said image pickup device and tilted by an angle with respect to said image pickup device, wherein a second image reflected by said mirror is adjustable by changing said angle, wherein said second image reflected by said mirror is also captured by said image pickup device, so that said first image and said second image are simultaneously captured by said image pickup device; and
    wherein overlapped images of said first image and said second image in accordance with two different viewing angles are obtained and analyzed through an image analysis program of said notebook computer to create a spatial image.

2. The notebook computer according to claim 1 further comprising:
    an input block served as a directive interface, wherein an image of said input block is reflected by said mirror, so that said image of said input block is captured by said image pickup device; and
    a screen for outputting a movable cursor, wherein a moving direction and a trajectory of said cursor are obtained according to a change of said image of said input block.

3. The notebook computer according to claim 2 wherein a user's finger is moved on said input block in a specified moving direction and a specified trajectory, thereby causing said change of said image of said input block.

4. The notebook computer according to claim 1 wherein said overlapped images include images of an object, wherein said object is included in said first image and said second image at said two different viewing angles.

5. The notebook computer according to claim 4 wherein said object is a human face, and said notebook computer has a facial recognition function by computing a spatial position of an organ on said human face.

6. The notebook computer according to claim 1 wherein said image pickup device has a function of detecting an environmental brightness value.

7. A notebook computer with multi-image capturing function, capable of detecting movements on an input block, comprising:
    an image pickup device for capturing a first image;
    a mirror disposed beside said image pickup device and tilted by an angle with respect to said image pickup device, wherein a second image reflected by said mirror is adjustable by changing said angle, and said second image reflected by said mirror is also captured by said image pickup device, so that said first image and said second image are simultaneously captured by said image pickup device;
    an input block served as a text input interface, said input block comprising a plurality of key regions with different symbols, wherein an image of said input block is reflected by said mirror, so that said image of said input block is captured by said image pickup device; and
    a screen for outputting a text that is inputted into said notebook computer, wherein said text that is inputted into said notebook computer is obtained according to a change of said image of said input block.

8. The notebook computer according to claim 7 wherein said key regions with different symbols on said input block are sheltered or depressed, thereby causing said change of said image of said input block.

9. A notebook computer with multi-image capturing function, capable of detecting brightness of an image by triggering an illuminating function of a keyboard, comprising:
    an image pickup device, capable of detecting brightness of an environment of said image and capturing a first image;
    a mirror disposed beside said image pickup device and tilted by an angle with respect to said image pickup device, wherein a second image reflected by said mirror is adjustable by changing said angle, and said second image reflected by said mirror is also captured by said image pickup device, so that said first image and said second image are simultaneously captured by said image pickup device, when said image pickup device detects the brightness of said keyboard is below a predetermined standard, said illuminating function of the keyboard is triggered.

* * * * *